United States Patent
Malayath

(10) Patent No.: US 7,852,940 B2
(45) Date of Patent: Dec. 14, 2010

(54) SCALABLE MOTION ESTIMATION FOR VIDEO ENCODING

(75) Inventor: Narendranath Malayath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 1455 days.

(21) Appl. No.: 11/255,433

(22) Filed: Oct. 20, 2005

(65) Prior Publication Data

US 2007/0092006 A1      Apr. 26, 2007

(51) Int. Cl.
*H04N 7/12* (2006.01)
(52) U.S. Cl. .................................. 375/240.16
(58) Field of Classification Search ............. 375/240.16
See application file for complete search history.

(56) References Cited

U.S. PATENT DOCUMENTS

| | | | |
|---|---|---|---|
| 6,014,181 A * | 1/2000 | Sun ............................ | 348/699 |
| 6,567,469 B1 * | 5/2003 | Rackett .................. | 375/240.16 |
| 6,842,483 B1 * | 1/2005 | Au et al. ................. | 375/240.16 |
| 6,940,907 B1 * | 9/2005 | Chen et al. ............. | 375/240.16 |
| 2002/0012396 A1 * | 1/2002 | Pau et al. ................ | 375/240.16 |
| 2002/0025001 A1 * | 2/2002 | Ismaeil et al. .......... | 375/240.16 |
| 2002/0114394 A1 * | 8/2002 | Ma ......................... | 375/240.16 |
| 2003/0161400 A1 * | 8/2003 | Dinerstein et al. ..... | 375/240.16 |
| 2004/0001545 A1 | 1/2004 | Chang | |
| 2005/0069037 A1 * | 3/2005 | Jiang ..................... | 375/240.16 |

OTHER PUBLICATIONS

Hosur et al., "Motion Vector Field Adaptive Fast Motion Estimation", Second International Conference on Information, Communications and Signal Processing (ICICS '99), Singapore, pp. 1-4, Dec. 7-10, 1999.*
Choi et al., "Fast motion estimation and mode decision with variable motion block sizes", Proceedings of SPIE, vol. 5150, Visual Communications and Image Processing, 2003, pp. 1561-1572.*
Kim et al., "Efficient search algorithm for block motion estimation", Journal of Electronic Imaging 11(1), Jan. 2002, pp. 69-74.*

(Continued)

*Primary Examiner*—Bhavesh Mehta
*Assistant Examiner*—David P Rashid
(74) *Attorney, Agent, or Firm*—Timothy F. Loomis; John G. Rickenbrode

(57) ABSTRACT

The disclosure is directed to scalable motion estimation techniques for video encoding. According to the motion estimation techniques, a motion vector search is scaled according to the computing resources available. For example, the extent of the search may be dynamically adjusted according to available computing resources. A more extensive search may be performed when computing resources permit. When computing resources are scarce, the search may be more limited. In this manner, the scalable motion estimation technique balances video quality, computing overhead and power consumption. The scalable motion estimation technique may search a series of concentric regions, starting at a central anchor point and moving outward across several concentric regions. The number of concentric regions searched for a particular video frame or macroblock is adjusted according to computing resources. Upon searching the anchor point, the search proceeds outward to the next concentric region, and continues as permitted by available computing resources.

29 Claims, 9 Drawing Sheets

OTHER PUBLICATIONS

Tourapis et al., "Predictive Motion Vector Field Adaptive Search Technique (PMVFAST)—Enhancing Block Based Motion Estimation", Visual Communications and Image Processing 2001 (VCIP'01), Jan. 2001, pp. 1-10.*

Bhaskaran V et al., "Motion Estimation Using a Computation-constrained criterion," Digital Signal Processing Proceedings, 1997. DSP 97., 1997 13th International Conference on Santorini, Greece Jul. 2-4, 1997, New York, NY, USA, IEEE, vol. 1, pp. 229-232.

Hye-Yeon, et al., "Fast Motion Estimation within the JVT codec" Joint Video Team (JVT) of ISO/IEC MPEG & ITU-T VCEG; $5^{th}$ meeting: Geneva, Switzerland, Oct. 9-17, 2002.

* cited by examiner

SCALABLE MOTION ESTIMATION FOR VIDEO ENCODING

TECHNICAL FIELD

The disclosure relates to digital video encoding and, more particularly, techniques for Inter-frame motion estimation.

BACKGROUND

A number of different video encoding standards have been established for encoding digital video sequences. The Moving Picture Experts Group (MPEG), for example, has developed a number of standards including MPEG-1, MPEG-2 and MPEG-4. Other examples include the International Telecommunication Union (ITU) H.261 standard, the ITU H.263 standard, and the emerging ITU H.264 standard. These video encoding standards generally support improved transmission efficiency of video sequences by encoding data in a compressed manner. Compression reduces the overall amount of data that needs to be transmitted for effective transmission of video frames.

The MPEG-4, ITU H.261, ITU H.263 and ITU H.264 standards, for example, support video encoding techniques that utilize similarities between successive video frames, referred to as temporal or Inter-frame correlation, to provide Inter-frame compression. The Inter-frame compression techniques exploit data redundancy across frames by converting pixel-based representations of video frames to motion representations, typically referred to as motion vectors. Frames encoded using Inter-frame techniques are referred to as P ("predictive") frames or B ("bi-directional") frames. Some frames, or macroblocks (MBs) within a frame, are encoded using spatial, Intra-frame compression, which is non-predictive. An Intra-coded frame is typically referred to as an I ("Intra") frame.

To encode a video frame, an encoder divides the video frame into macroblocks and searches macroblocks within an adjacent video frame to identify the most similar macroblock. This process, referred to as motion estimation, is computationally intensive. The encoder encodes differences between the macroblocks, and generates a motion vector that identifies the macroblock from the adjacent video frame. A decoder receives the motion vector and encoded differences, and performs motion compensation to generate a sequence of video frames.

SUMMARY

The disclosure is directed to scalable motion estimation techniques for video encoding. According to the disclosed motion estimation techniques, a motion vector search is scaled according to the amount of computing resources available at the time of the search. For example, the extent of the motion vector search may be dynamically adjusted according to available computing resources. A more extensive search may be performed when computing resources permit. Alternatively, when computing resources are scarce, the search may be more limited. In this manner, the scalable motion estimation technique can balance video quality, computing overhead and power consumption.

The scalable motion estimation technique may be configured to search a series of concentric regions, starting at a central anchor point and moving outward. In some embodiments, the concentric regions may be shaped as diamonds. The number of concentric regions searched for a particular video frame or macroblock is adjusted according to the amount of available computing resources. The concentric regions start with a central point anchored at an initial motion vector prediction. Upon evaluating the central anchor point, the search proceeds outward to the next concentric region, and continues to the extent permitted by available computing resources.

The concentric search described above can be modified in many ways. One variation is to sub-sample the concentric regions in order to cover a wider search range without significantly increasing the number of searches. For example, in a first stage, even numbered regions are searched until a minimum is found. Then, in a second stage, both even and odd numbered regions are searched around that minimum. This type of searching can be referred to as a multi-resolution, concentric region search. Upon finding a minimum, the anchor point of the concentric regions may be reset to center the regions over the current minimum at each stage of the search.

In one embodiment, the disclosure provides a video encoding method comprising defining an anchor point within an array of video blocks, defining multiple concentric regions centered at the anchor point, evaluating video blocks associated with the concentric regions to identify a video block yielding a minimum difference value relative to a current video block to be encoded, and encoding the current video block with a motion vector based on the identified video block.

In another embodiment, the disclosure provides a video encoder comprising a memory storing an array of video blocks, and a processor that defines multiple concentric regions centered at an anchor point within the array of video blocks, evaluates video blocks associated with the concentric regions to identify a video block yielding a minimum difference value relative to a current video block to be encoded, and encodes the current video block with a motion vector based on the identified video block.

In an additional embodiment, the disclosure provides a video encoder comprising means for defining an anchor point within an array of video blocks, means for defining multiple concentric regions centered at the anchor point, means for evaluating video blocks associated with the concentric regions to identify a video block yielding a minimum difference value relative to a current video block to be encoded, and means for encoding the current video block with a motion vector based on the identified video block.

In a further embodiment, the disclosure provides a video encoding method comprising selecting a number of concentric regions within a video block search space based on an indication of available computing power, and evaluating video blocks associated with the selected number of concentric regions within a video block search space to identify a video block yielding a minimum difference value relative to a current video block to be encoded, and encoding the current video block with a motion vector based on the identified video block.

The disclosure also contemplates computer-readable media comprising instructions to cause one or more processors forming a video encoder to carry out all or part of any of the techniques described herein.

The details of one or more embodiments are set forth in the accompanying drawings and the description below. Other features, objects, and advantages will be apparent from the description and drawings, and from the claims.

DETAILED DESCRIPTION

Figure 1:
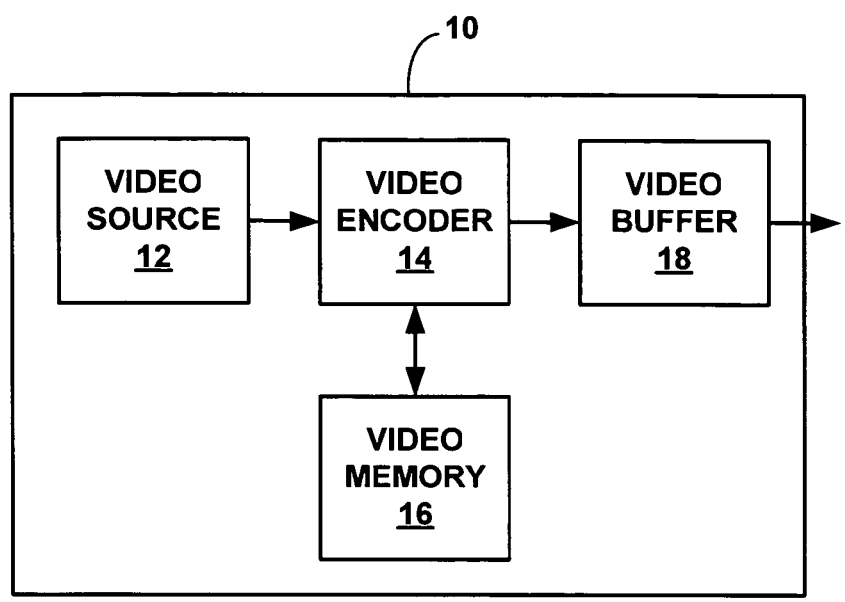
FIG. 1 is a block diagram illustrating a video encoding system.

FIG. 1 is a block diagram illustrating a video encoding system 10. As shown in FIG. 1, system 10 includes a video source 12, a video encoder 14, a video memory 16, and a video buffer 18. Video encoder 14 implements a scalable motion estimation technique. As will be described, video encoder 14 scales the motion vector search according to the amount of computing resources available at the time of the search. For example, video encoder 14 adjusts the extent of the motion vector search according to available computing resources within a device associated with video encoding system 10. A more extensive search may be performed when computing resources permit. Alternatively, when computing resources are scarce, the search may be more limited. In this manner, the scalable motion estimation technique balances video quality against computing overhead and power consumption.

Video source 12 may be a video capture device, such as a camera, that obtains a video sequence, or a video archive storing a pre-recorded video sequence. Video encoder 14 stores video data obtained from video source 12 in video memory 16 during the video encoding process. Video encoder 14 may be configured to support video encoding according to any of a variety of video compression techniques such as those outlined in the MPEG-4, ITU H.261, ITU H.263 and ITU H.264 standards. Video encoding system 10 may further include audio encoding functionality to permit encoding of both audio and video. Video buffer 18 provides an output buffer for encoded video data.

The encoded video data may be transmitted over a wired or wireless communication channel. Video encoding system 10 may reside within a device that further includes appropriate transmit, receive, modem, and processing electronics to support wired or wireless communication. For example, video encoding system 10 may reside within a wireless mobile terminal or a wired terminal equipped for communication with other terminals. Examples of wireless mobile terminals include mobile radio telephones, mobile personal digital assistants (PDAs), mobile computers, or other mobile devices equipped with wireless communication capabilities and video encoding and/or decoding capabilities. Examples of wired terminals include desktop computers, video telephones, network appliances, set-top boxes, interactive televisions, or the like.

Video encoder 14 implements a scalable motion estimation technique in which the extent of motion vector search is scaled according to the amount of computing resources available at the time of the search. For example, the scalable motion estimation technique may be configured to search a series of concentric regions, starting at a central region and moving outward. In some embodiments, the concentric regions may be shaped as concentric diamonds. Video encoder 14 adjusts the number of concentric regions searched for a particular video frame or macroblock according to the amount of available computing resources. In this manner, the motion vector search continues to expand outward across successive concentric regions to the extent permitted by available computing resources. Upon identifying a motion vector that satisfies a quality threshold, or reaching a search limit determined according to available computing resources, video encoder 14 terminates the motion vector search.

Video encoder 14 may be implemented in hardware, software, firmware or any combination thereof. For example, various aspects of video encoder 14 may be implemented within one or more digital signal processors (DSPs), microprocessors, application specific integrated circuits (ASICs), field programmable logic arrays (FPGAs), or any other equivalent integrated or discrete logic circuitry, as well as any combinations of such components. The term "processor" may generally refer to any of the foregoing logic circuitry, alone or in combination with other logic circuitry. When implemented in software, the functionality ascribed to video encoder 14 may be embodied as instructions on a computer-readable medium such as random access memory (RAM), read-only memory (ROM), non-volatile random access memory (NVRAM), electrically erasable programmable read-only memory (EEPROM), FLASH memory, magnetic media, optical media, or the like. The instructions are executed to support one or more aspects of the functionality described in this disclosure.

Video encoder 14 applies the scalable motion estimation technique to video blocks within a video frame. Each video block includes an array of pixels that encode video data. In some embodiments, a video block may be a macroblock or a microblock, e.g., as defined in MPEG-4 compliant video encoding. A macroblock is a 16 by 16 array of pixels. A microblock is an 8 by 8 array of pixels. However, other video block sizes can be used. Each pixel in a microblock or macroblock may be represented by an n-bit value, e.g., 8 bits, that defines visual characteristics of the pixel such as color and intensity, e.g., chrominance and luminance. However, motion estimation ordinarily is performed only on the luminance component because human vision is more sensitive to changes in luminance than color. Accordingly, for purposes of motion estimation, the entire n-bit value may quantify luminance for a given pixel.

For each video block in a current video frame, video encoder 14 searches video blocks stored in video memory 16 for an adjacent (preceding or succeeding) video frame to identify a similar video block. Video encoder 14 determines the difference between the identified video blocks and the current video block to be encoded, and encodes the current video block using a motion vector that identifies the video block from the adjacent frame that yields a minimum difference value relative to the current video block. The minimum difference value need not be the absolute minimum difference value that would be produced by a video block that closely matches the current video block, but rather the smallest difference value among those video blocks actually evaluated. The process of encoding the differences between the current video block and the predictive block identified through motion estimation is commonly referred to as motion compensation, and the result of these encoded differences is referred to as the residual. In this manner, instead of encoding each frame as an independent picture, video encoder 14 encodes the differences between adjacent frames. Motion estimation involves identification of the video block, in the adjacent frame, that best matches a video block in the current frame. By encoding video blocks using motion vectors, the required bandwidth for transmission of video data can be significantly reduced. However, the motion vector search is computationally intensive, and presents a significant load on computing resources and power consumption.

Figure 2:
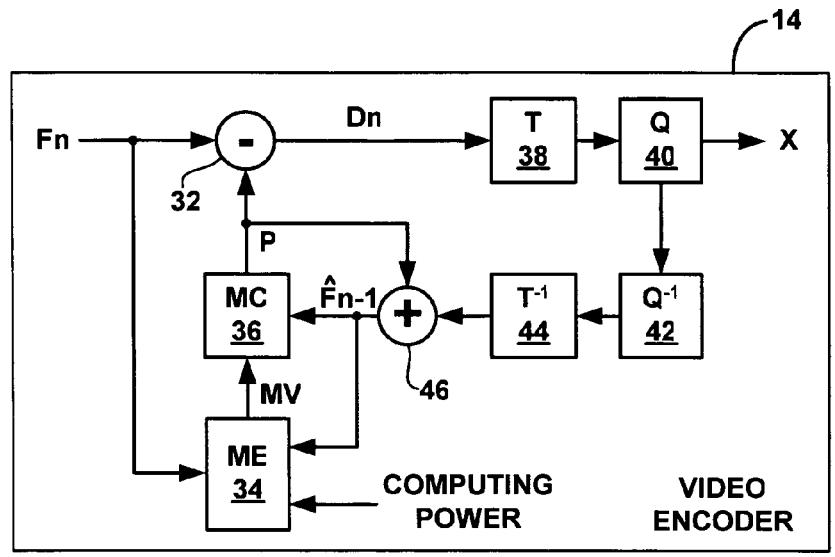
FIG. 2 is a block diagram illustrating a video encoder employing a scalable motion estimation technique.

FIG. 2 is a block diagram illustrating a video encoder 14 employing a scalable motion estimation technique. As shown in FIG. 2, video encoder 14 includes difference unit 32, motion estimation (ME) unit 34, motion compensation (MC) unit 36, transform (T) unit 38, quantization (Q) unit 40, inverse quantization ($Q^{-1}$) unit 42, inverse transform ($T^{-1}$) unit 44, and summer 46. In various embodiments, the various components of video encoder 14 described above may be realized as functional modules, units or features of one or more programmable processors, as described above. As will be described, ME unit 34 is configured to apply a scalable motion estimation technique. The scalable motion estimation technique may employ a concentric region search as described herein.

With further reference to FIG. 2, difference unit 36 subtracts an Inter- or Intra-prediction P from an incoming digital video frame Fn to produce a difference Dn. The Inter- or Intra-prediction P is obtained from MC unit 36. A mode selection unit (not shown) determines whether Inter- or Intra-coding should be applied to the current video frame Fn. Transform unit 38 applies a standard compression transform, such as the discrete cosine transform (DCT), to transform the output Dn of difference unit 36 into frequency components. Quantization unit 40 quantizes the transformed output to produce X, which is a set of quantized transform coefficients.

ME unit 34 and MC unit 36 cooperate to perform Inter-coding of frame Fn, e.g., according to the MPEG-4, ITU H.263 or ITU H.264 compression method. ME unit 34 and MC unit 36 support standard Inter-coding of the incoming frame Fn relative to one or more previously encoded frames $\hat{F}$ n−1. In particular, MC unit 36 forms an Inter prediction P by a motion-compensated prediction from one or more previous frames $\hat{F}$ n−1. The previous frames are encoded and reconstructed by inverse quantization unit 42, inverse transform unit 44, and summer 46 to produce reconstructed frame $\hat{F}$ n−1.

ME unit 34 searches at least a portion of the reconstructed frame $\hat{F}$ n−1 for a video block that most closely approximates a video block in the present frame Fn, and generates a motion vector (MV) for use by MC unit 36. As further shown in FIG. 2, ME unit 34 also receives an indication of available computing power and uses this indication to control the extent of the motion vector search. In this manner, ME unit 34 is responsive to the available amount of computing power, and controls the search to balance video quality versus computing overhead and power consumption. MC unit 36 encodes the differences between the current video block and the predictive block identified by the motion vector produced by ME unit 34.

Figure 3:
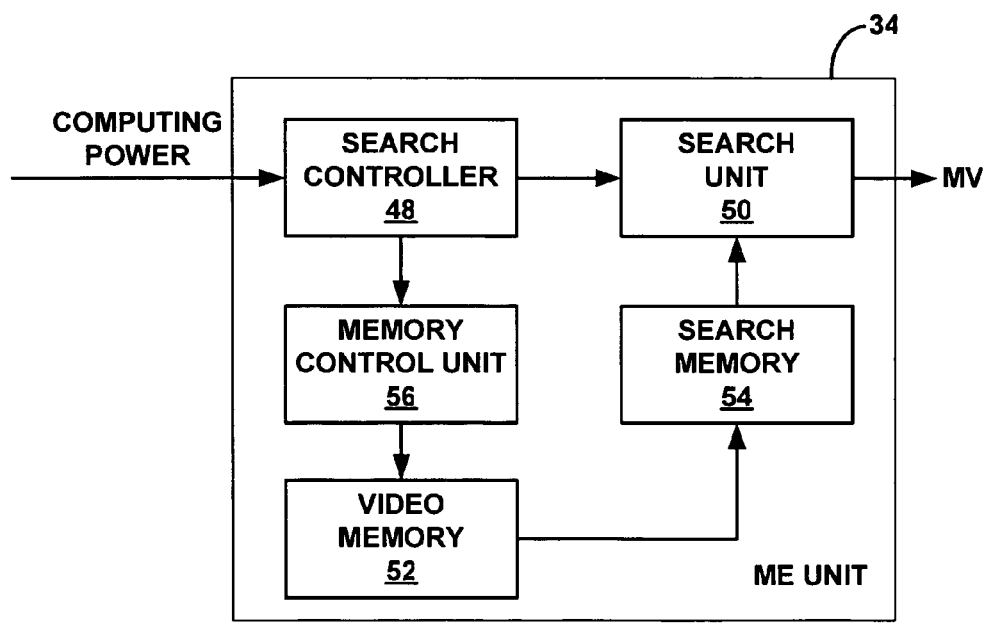
FIG. 3 is a block diagram illustrating a motion estimation unit configured to implement a scalable motion estimation technique.

FIG. 3 is a block diagram illustrating ME unit 34 of FIG. 2 in greater detail. ME unit 34 is configured to implement a scalable motion estimation technique, as described in this disclosure. In the example of FIG. 3, ME unit 34 includes a search controller 48, a search unit 50, a video memory 52, a search memory 54 and a memory control unit 56. Search unit 50 performs a search to identify video blocks within a previously encoded frame that are similar to video blocks with the currently encoded frame. Based on the search, search unit 50 generates a set of motion vectors that characterizes differences between the current frame to be encoded and a previously encoded frame that most closely matches the current frame.

Search controller 48 controls the extent of the search performed by search unit 50 based on available computing power. The search performed by search unit 50 is computationally intensive. Search controller 48 controls the extent of the search in order to balance video quality against computing overhead and power consumption. If available computing power is relatively high, for example, search controller 48 permits an extended search that emphasizes video quality. If available computing power is relatively low, however, search controller limits the extent of the search in order to avoid excessive computing load and associated power consumption.

Search unit 50 may apply a concentric region search, as described in this disclosure. According to the concentric region search, search unit 50 defines an anchor point within an array of video blocks in a search space, and defines multiple concentric regions centered at the anchor point. The number of concentric regions may be selected according to an indication of available processing power. Search unit 50 searches the concentric regions to evaluate video blocks associated with the concentric regions for differences relative to a current video block to be encoded. Based on this evaluation, search unit 50 identifies a video block yielding a minimum difference value relative to the current video block to be encoded, and generates a motion vector based on the identified video block. Again, the minimum difference value refers to the smallest difference value among the video blocks evaluated by search unit 50, although it is possible that smaller difference values may be produced by video blocks that are not evaluated. Video encoder 14 encodes the current video block using the motion vector generated by motion estimation unit 34. In particular, the differences between the current video block and the predictive block identified by the motion vector are encoded by motion compensation unit 36.

Search unit 50 starts with a central region and then extends outward to apply the search across a series of concentric regions. Again, search controller 48 controls the number of regions searched by search unit 50 based on available computing power. Search controller 48 may dynamically adjust the number of regions searched by the search unit 50 as available computing power changes. The number of concentric regions searched by search unit 50 may be pre-established by search controller 48 for each video block to be encoded based on the computing power available at the time the search is started for the video block.

As an alternative, the number of concentric regions searched by search unit 50 may be controlled during the course of the search. In this case, if available computing power increases or decreases, the number of concentric regions searched may be increased or decreased, respectively, during the course of the search. In some embodiments, the search may continue until the number of regions searched by the search unit 50 exceeds a limit that is determined based on the level of available computing power. The number of regions searched by search unit 50 also may be subject to a minimum number of regions to ensure at least a minimum level of video quality, even when available computing resources are low.

Video memory 52 stores video data obtained by a video source, such as a video capture device or video archive. Search memory 54 stores an array of candidate video blocks to be searched by search unit 50 for identification of video blocks in the current and previously encoded video frames that are most similar. Search memory 54 may store an entire frame of candidate video blocks or a portion of a frame. The candidate video blocks are video blocks from a reference frame, which may be a previously encoded frame that either precedes or follows the current frame to be encoded.

Search unit 50 evaluates the video blocks associated with the anchor point and the concentric regions to determine difference values relative to the current video block to be encoded. Similarity between the candidate video blocks and the current video block may be expressed as a difference value, such as a sum of absolute difference (SAD) or sum of squared difference (SSD) metric, which quantifies the pixel differences between video blocks in the current and previously encoded video frames. The pixel differences may be expressed, for example, as differences in luminance.

Search unit 50 accesses search memory to retrieve candidate video blocks within the current frame and video blocks within concentric regions of the previously encoded frame. The video blocks searched by search unit 50 may be sized, for example, as macroblocks or microblocks. Memory control unit 56 operates under control of search controller 48 to transfer video data from video memory 52 to search memory 54 for used by search unit 50 in evaluating candidate video blocks. For example, search controller 48 may control memory control unit 56 so that video blocks associated with concentric regions to be searched by search unit 50 are transferred to search memory 54. Based on the comparison of a video block from the current frame to video blocks within a previously encoded frame, search unit 50 identifies the most similar video block in the previously encoded frame, i.e., the video block having the minimum difference value among the evaluated video blocks, and generates a motion vector (MV) identifying the position of the previous video block relatively to the currently encoded video block.

The indication of computing power received by search controller 48 may be expressed in a variety of ways. For example, search controller 48 may receive a computing power indication expressed as a number of cycles available from a processor core for use in motion estimation for a given frame or video block. The number of cycles may specify a number of cycles per unit time, or an absolute number of cycles available for motion estimation for a frame or video block with the frame. Alternatively, search controller 48 may receive an index value that is proportional to the number of available processing cycles. For example, search controller 48 may receive a computing power index value on a scale of 0 to n, wherein 0 represents no available computing power for motion estimation and n represents maximum availability of computing power. As a further alternative, search controller 48 may receive a percentage value indicating a percentage of maximum computing power available for motion estimation.

The computing power indication may be dynamically updated at frequent intervals. For example, the updated computing power indication may be provided by the processor core to search controller 48 at periodic intervals. In other cases, search controller 48 may request the computing power indication at periodic intervals or at different stages within the motion estimation process. In particular, search controller 48 may request the computing power indication at the beginning of motion estimation for a video frame. Alternatively, search controller 48 may request the computing power indication at the beginning of motion estimation of each video block within a video frame. Search controller 48 may access a register or other storage element to retrieve the computing power indication. In this case, the processor core may continuously or periodically write the computing power indication to the storage element for retrieval by search controller 48.

As another alternative, search controller 48 may receive the computing power indication as an incremental up/down adjustment to steady state computing power. For example, instead of an absolute value, index value, or percentage value, search controller 48 may receive either an up (1) or down (0) value indicating that computing power for motion estimation is to be increased or decreased, respectively, by a single fixed increment. Based on the up/down adjustments received over a period of time, search controller 48 maintains an estimate of available computing power for motion estimation, and uses that estimate to control the extent of the search performed by search unit 50.

Hence, the computing power indication used by search controller 48 may take any of a variety of forms, provided the indication generally serves to represent the computing power that can be devoted to the motion estimation process performed by ME unit 34. In each case, search controller 48 maps the available computing power to the extent of the search to the performed by search unit 50. In the case of a concentric region search, the extent of the search may be expressed as the number of regions to be searched, starting with a central region and then extending outward across each of the concentric regions. A concentric region is searched in the sense that video blocks associated with the concentric region are evaluated to determined difference values relative to the current video block to be encoded.

When a low level of computing power is available, for example, the concentric region search only extends outward to a limited extent. In other words, search unit 50 only evaluates video blocks associated with a number of concentric regions that is commensurate with the available computing power. When a high level of computing power is available, the concentric region search may extend out much further, to a number of concentric regions commensurate with the computing power, or possibly to a maximum number of concentric regions if maximum computing power is available.

Figure 4A:
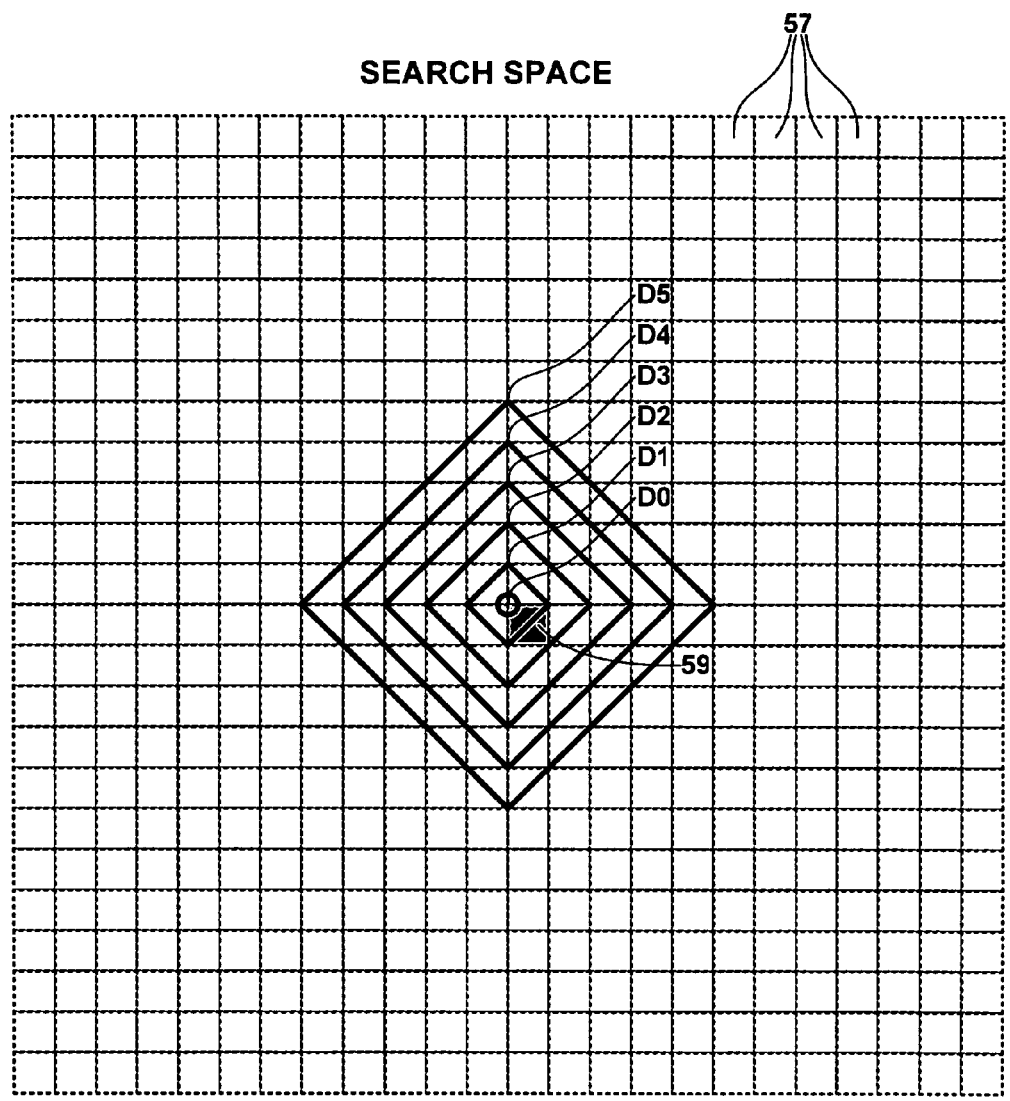
FIGS. 4A, 4B and 4C are search space diagrams illustrating a concentric region search forming part of a scalable motion estimation technique.
Figure 4B:
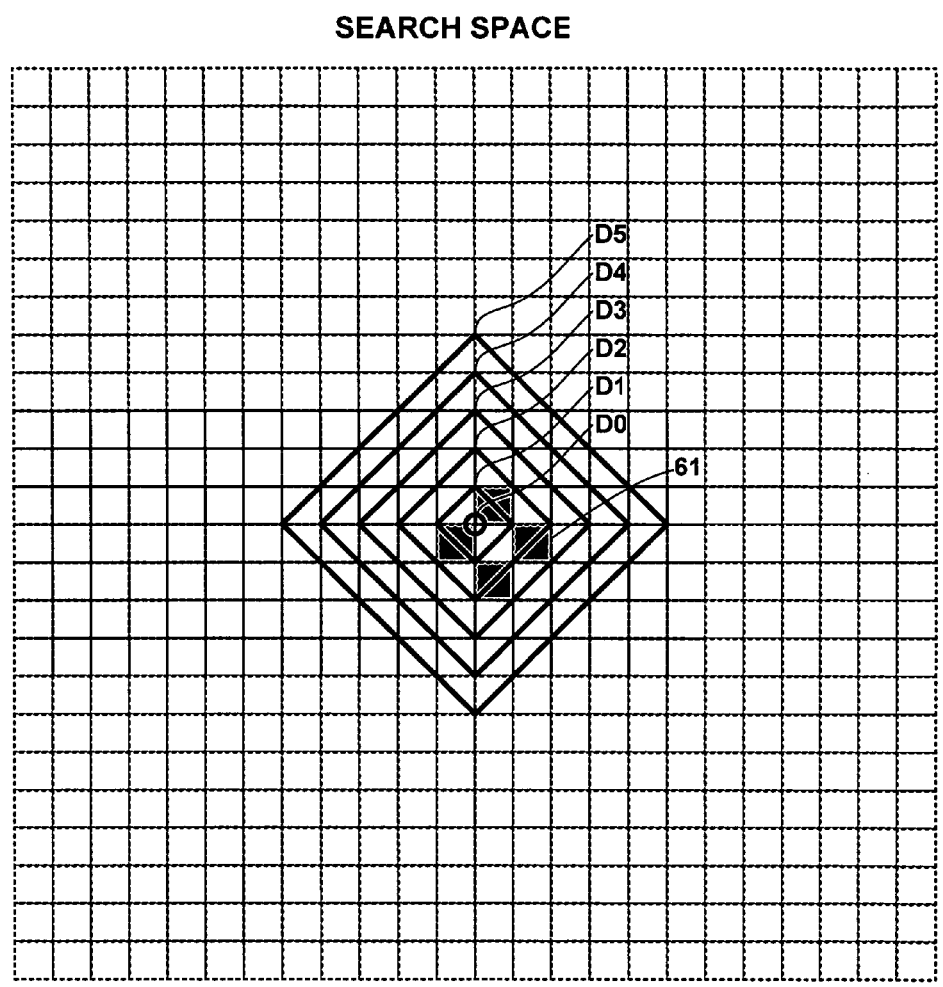
Figure 4C:
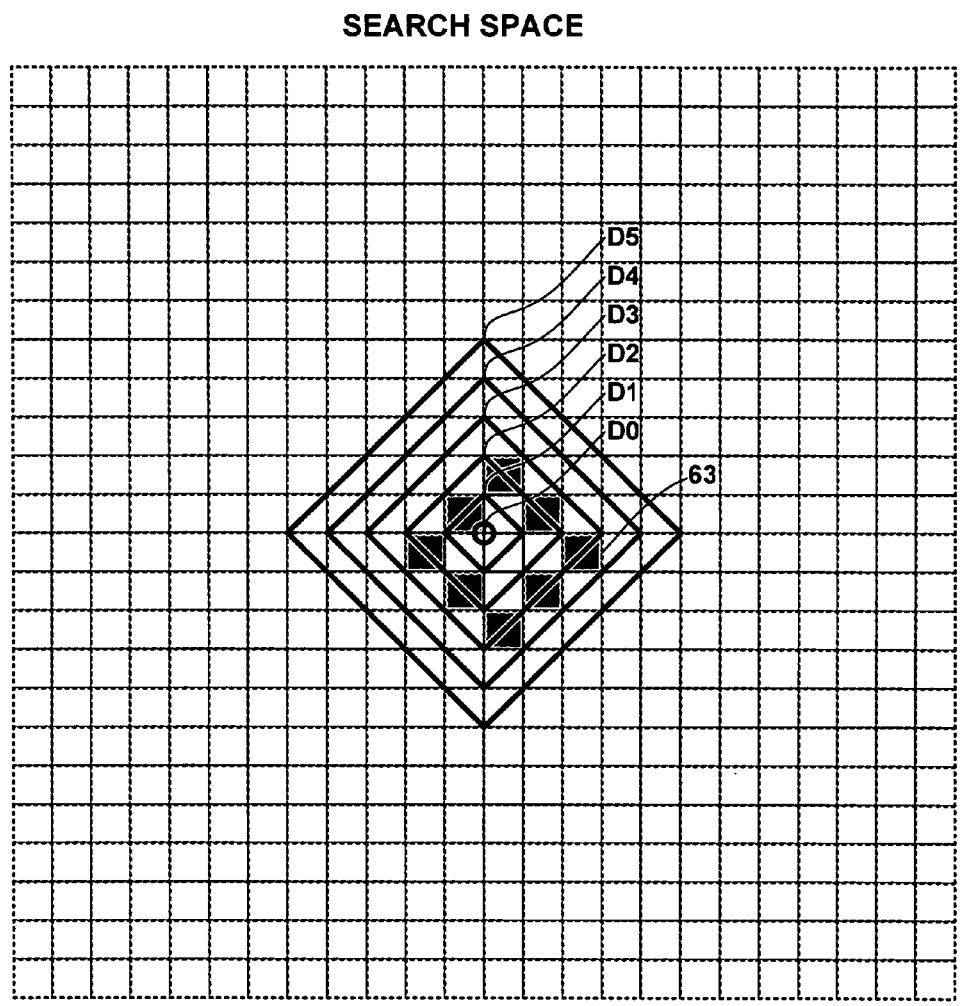

FIGS. 4A, 4B and 4C are search space diagrams illustrating a concentric region search forming part of a scalable motion estimation technique in accordance with this disclosure. In FIGS. 4A, 4B and 4C, a search space defines at least a portion of the video blocks within a video frame to be encoded. In FIG. 4A, reference numeral 57 points to a series of adjacent video blocks. The video blocks are arranged in a two-dimensional array within the search space and may be sized as macroblocks, microblocks, or other block sizes. An anchor point D0 and a series of concentric regions D1, D2, D3, D4, D5 define an iterative search window. In the example of FIG. 4, regions D1-D5 are shaped as concentric diamonds. Anchor point D0 corresponds to the initially predicted motion vector position. The concentric diamond regions are centered around the predicted MV position. In this manner, the concentric diamond search establishes an order in which to proceed with the search.

Within the search window, search unit 50 searches for video blocks from a previously encoded frame that most closely match video blocks within a currently encoded frame. The previously encoded frame may be referred to as a reference frame. In general, search unit 50 computes difference values between a video block in the frame to be encoded and video blocks within the search window to identify the most similar video block. In operation, the search begins at anchor point D0. Anchor point D0 identifies a video block in the reference frame that is aligned with, i.e., at the same position with the frame as, the video block to be encoded. Alternatively, in some embodiments, anchor point D0 may be placed at a different position based on video frame content analysis. In either case, anchor point D0 identifies the first video block in the reference frame to be compared to the video block in the current frame to be encoded.

Anchor point D0 may identify the upper left pixel coordinates of the video block to be evaluated. For example, each video block includes an array of pixels, each addressable by an X-Y coordinate. The anchor point D0 identifies the X-Y coordinates of the upper left pixel of a video block 59. Video block 59 is shaded gray in FIG. 4A. Once the difference value, e.g., SAD or SSD, is determined between video block 59 of the reference frame and the video block to be encoded in the current frame, search unit 50 expands the search window outward to encompass video blocks identified by the first concentric diamond D1.

Diamond D1 is centered at anchor point D0. The perimeter of diamond D1 crosses or contains the upper left X-Y coordinates of several video blocks. Provided there is sufficient computing power, search unit 51 next evaluates the video blocks having upper left X-Y coordinates on or within the perimeter of diamond D1, with the exception of any video blocks that have already been searched, such as the video block 59 identified by anchor point D0. Video blocks 61 having upper left X-Y coordinates on or within the perimeter of diamond D1 are shaded gray in FIG. 4B. Search unit 50 searches for the minimum difference value among the video blocks 61.

Once the search is completed for diamond D1, the search expands outward to video blocks identified by concentric diamond D2, provided there is sufficient computing power. In the example of FIG. 4C, search unit 50 searches the video blocks specified by perimeter of diamond D2. As in the case of diamond D1, the perimeter of diamond D2 either crosses or encompasses the upper left pixel coordinates of a set of video blocks. Search unit 50 searches the video blocks on or within the perimeter of diamond D2, with the exception of video blocks already searched as part of the search window defined by anchor point D0 and concentric diamond D1. The video blocks searched within diamond D2 are shaded in gray and identified by reference numeral 63.

The process continues outward in a similar manner across the remaining concentric diamonds D3, D4, D5, to the extent supported by available computing power. If search controller 48 determines that there is insufficient computing power, the search may be terminated by search unit 50 at any level of the concentric region search. In some cases, for example, the search may extend only to the video block identified by anchor point D0. In other cases, with greater computing power, the search may extend to evaluation of video blocks associated with concentric diamonds D1, D2, D3, D4 or D5, depending on the level of computing power available at the time of the search. Also, search unit 50 may terminate the search based on other constraints, such as satisfaction of a difference value threshold, a maximum iteration constraint, or a minimum change constraint.

For example, search unit 50 may terminate the search if one of the video blocks produces a difference value that satisfies a desired difference threshold, such as a SAD threshold. In other words, if one of the video blocks produces a difference value, e.g., a SAD value, that is sufficiently small relative to the difference threshold, the search may be terminated. As a further option, search unit 50 may terminate the search if the change in difference value between minimum difference values obtained in successive concentric regions is less than an applicable threshold value. This constraint may be based on the assumption that a better video block is unlikely to be obtained when the improvement between concentric regions is small.

The regions shown in FIGS. 4A-4C are concentric in the sense that each region is centered about a common anchor point D0. In addition, each concentric region D1-D5 may have a similar shape, but a different size. Although FIGS. 4A-4C show an anchor point D0 and five concentric regions D1-D5, there may be a lesser or greater number of concentric regions. Accordingly, the number of regions shown in FIGS. 4A-4C is provided for purposes of illustration, and should not be considered limiting. Also, concentric regions having different shapes may be used. In some embodiments, for example, circles, triangles, rectangles or asymmetric shapes may be used.

Figure 5:
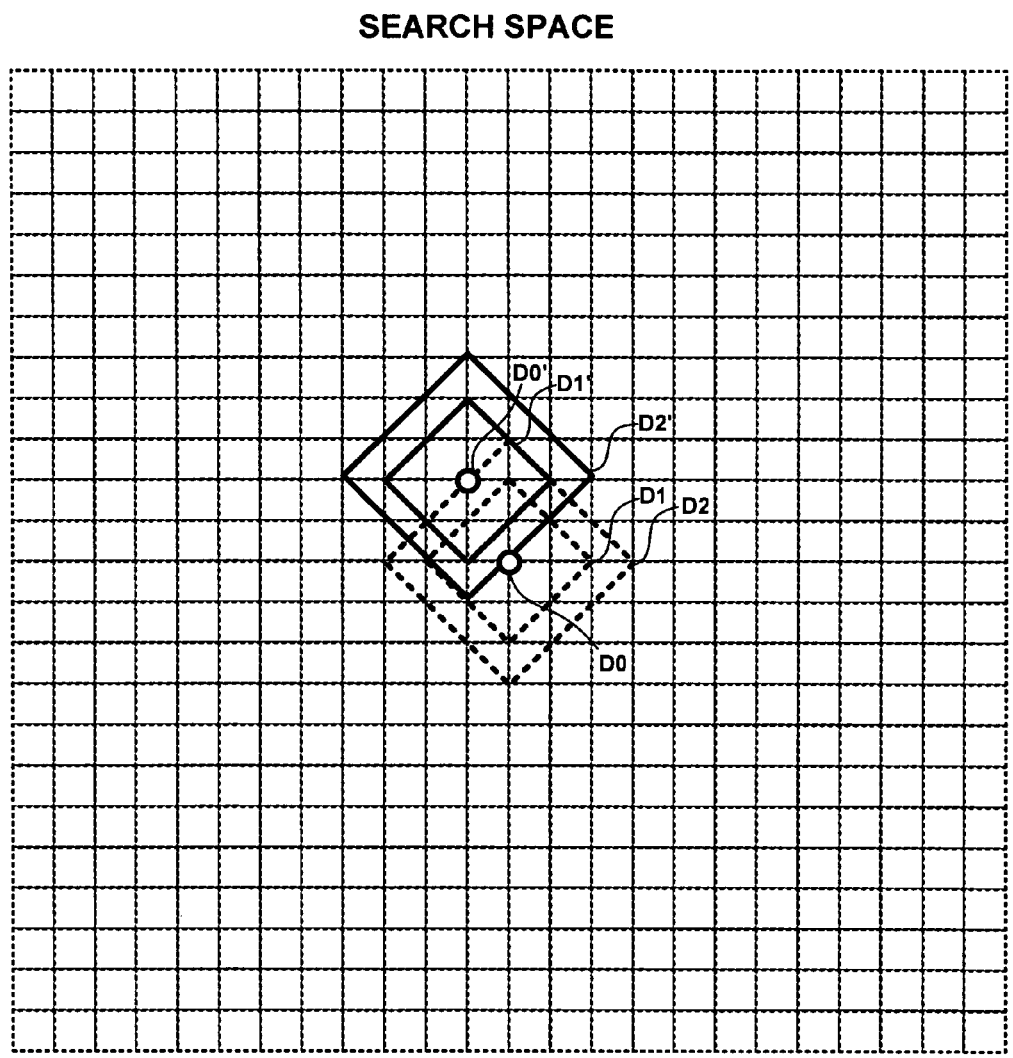
FIG. 5 is a search space diagram illustrating a concentric, movable region search forming part of an alternative scalable motion estimation technique.

FIG. 5 is a search space diagram illustrating a concentric, movable diamond search forming part of an alternative scalable motion estimation technique. The diamond search illustrated in FIG. 5 generally corresponds to the search shown in FIGS. 4A-4C in the sense that it relies on a progressive, outward search of concentric regions to define a search window for motion estimation. However, FIG. 5 further illustrates movement of the concentric diamonds according to search results. After the search progresses from initial anchor point D0, to concentric diamond D1 and then concentric diamond D2, the anchor point is reset. In particular, after two concentric diamonds D1, D2 have been searched, the anchor point D0 is reset to anchor point D0'.

New anchor point D0' identifies the upper left pixel coordinates of the video block that yielded the minimum difference value during the search of diamonds D1, D2. Concentric diamonds D1' and D2' are then anchored about new anchor point D0' for additional searching. The process may continue by resetting the new anchor point D0' to another anchor point D0" after new concentric diamonds D1' and D2' have been searched. In this manner, the search window not only extends concentrically outward, but also moves to a new anchor point within the video frame at selected stages of the search.

Movement of the anchor point D0 after searching every two diamonds is described above for purposes of illustration and should not be considered limiting. Rather, the anchor point may be moved after any number of concentric diamonds have been searched. For example, the anchor point may be moved after three, four or more concentric diamonds have been searched. In addition, the video block searched at anchor point D0 may yield the minimum difference value, in which case there is no need to move the search window to a new anchor point D0'.

The movement of the search window and the number of concentric diamonds searched around each anchor point may be subject to control by search controller 48 according to the amount of computing power available at the start of the search or during the course of the search, as described herein. For example, search controller 48 may specify a maximum number of movements of the anchor point, and a maximum number of concentric diamonds to be search at each anchor point, based on the indication of available computing power at the start of motion estimation for a particular frame or video block. Alternatively, search controller 48 may dynamically control the number of movements or concentric diamonds during the course of a motion vector search as the indication of available computing power changes. In either case, the extent of the concentric diamond search is scalable according to the available computing power.

The probability of finding an optimal motion vector (MV) typically decreases as the distance from an initially predicted motion vector location increases. Typically, the predicted MV is computed as the median of the left and top neighboring video blocks, relative to the location of the video block to be encoded. The distribution of motion vectors extracted from a few video sequences using an exhaustive search shows that the predicted motion vector is most probable candidate to be optimal. The motion estimation techniques described in this disclosure take advantage of this realization. As more computational resources are available, the motion vector search starts from the initially predicted motion vector candidate and moves out in concentric diamonds. Hence, the search starts with the most likely candidate, i.e., the initial prediction, and moves outward across the concentric diamond regions to the extent permitted by available computing power.

The amount of available computing power impacts the numbers of motion vector searches that can be performed. The Table below illustrates an exemplary scalable search sequence over the set of concentric diamonds D0-D5 shown in FIGS. 4A-4C. In particular, Table 1 shows the search sequence for different numbers of searches made possible by different amounts of computing power.

TABLE

| Number of searches possible | Search Sequence |
| --- | --- |
| 0 | Select the predicted MV (D0) |
| 5 <= Searches possible < 13 | Search D0 and D1 |
| 13 <= Searches possible < 25 | Search D0, D1 and D2 |
| 25 <= Searches possible < 41 | Search D0, D1, D2 and D3 |
| 41 <= Searches possible < 51 | Search D0, D1, D2, D3 and D4 |
| 51 <= Searches possible < 75 | Search D0, D1, D2, D3, D4 and D5 |

As illustrated in Table 1, when no searches are available due to insufficient computing power, no searches are performed. Instead, search unit 50 simply selects the motion vector (MV) identified by anchor point D0. If five to twelve searches are available, search unit 50 searches both anchor point D0 and diamond region D1. In this case, anchor point D0 counts as one search, and the four video blocks specified by diamond D1 counts as four searches, resulting in a sum of five searches. If thirteen to twenty-five searches are available, search unit 50 searches anchor point D0, first concentric diamond D1 and second concentric diamond D2. If additional searches are available, the search can be scaled upward so that outer concentric diamonds, e.g., D3, D4, D5, may also be searched.

The basic search process illustrated in FIGS. 4A-4C can be modified in many ways. One variation is to provide a moving search window, as shown in FIG. 5. Another variation is to sub-sample the concentric diamonds in order to cover a wider search range without significantly increasing the number of searches. For example, in a first stage, search unit 50 may search only even numbered diamonds, e.g., D0, D2, D4. Once the first stage produce a minimum difference value, the even and odd diamonds can be recentered around an anchor point corresponding to the minimum. Then, in a second stage, both even and odd diamonds are searched in an attempt to identify an even better motion vector. This type of searching may be referred to as a multi-resolution diamond search in the sense that it first involves a sub-sampling of the diamonds, followed by a full search of the diamonds once the diamonds are recentered. The variations described above are provided for purposes of example. However, other variations are possible within the general framework of a concentric diamond search, as described herein.

Figure 6:
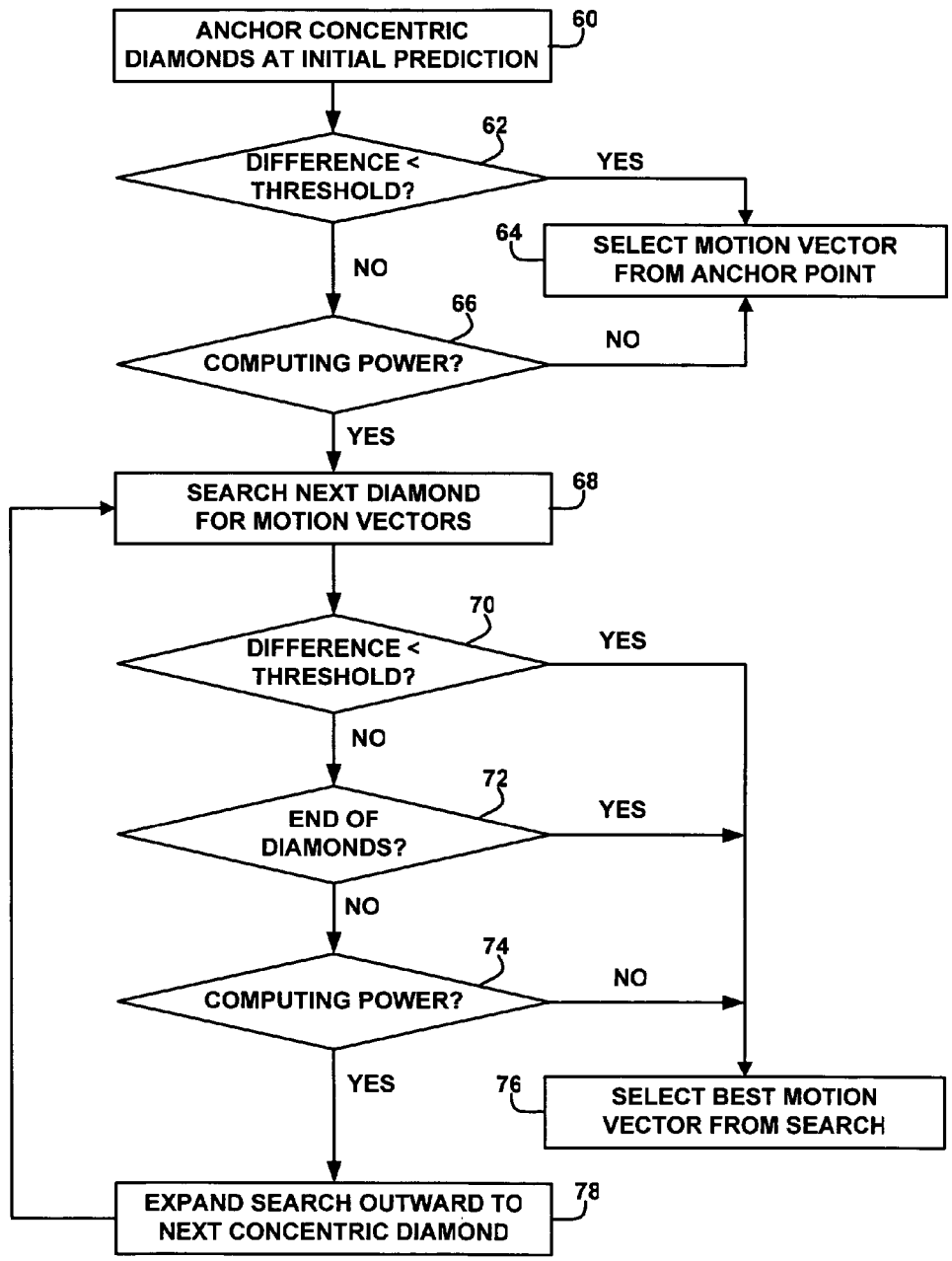
FIG. 6 is a flow diagram illustrating a scalable motion estimation technique using a concentric region search.

FIG. 6 is a flow diagram illustrating a scalable motion estimation technique using a concentric region search. FIG. 6 generally illustrates the process shown in the search space diagrams of FIGS. 4A-4C. As shown in FIG. 6, search unit 50 anchors a set of concentric diamonds at an X-Y coordinate corresponding to an initial motion vector prediction (60). The initial motion vector prediction, corresponding to the initial anchor point, may be based on the median of the left and top neighboring video blocks positioned adjacent the video block to be encoded. Other techniques for determining the initial anchor point may be used. For example, the initial anchor point can be selected using linear or non-linear functions based on motion vectors of video blocks located at defined locations relative to a current video block to be encoded. For example, a median function, a mean function or a weighted function based on the motion vectors of the video blocks can be used. Search unit 50 determines the difference value between the video block identified by the anchor point and the video block to be encoded. If the difference value is less than an applicable threshold (62), such as a SAD threshold, the search may be terminated. In this case, the motion vector may be selected from the anchor point (64).

If the difference value exceeds the difference threshold (62), however, search controller 48 determines whether there is sufficient computing power (66) to scale the search outward to the first concentric diamond region. If there is not sufficient computing power to support expansion, then the motion vector may be selected from the anchor point (64), i.e., from the initial prediction. If sufficient computer power is available (66), however, search controller 48 permits search unit 50 to expand the search outward and search the next diamond for motion vectors (68). If search unit 50 finds a video block with a satisfactory difference value (70) within the diamond, the search unit selects the motion vector associated with the pertinent video block as the best motion vector from the search (76).

If the difference threshold is not satisfied (70), and end of the diamonds has not yet been reached (72), and there is sufficient computing power (74), search unit 50 expands the search outward to the next concentric diamond (78). If none of the above conditions (70), (72), (74) is satisfied, then search unit 50 selects the best motion vector found in the search up to that point (76). Upon expanding the search outward (78), search unit 50 searches the next diamond (68), and continues the motion estimation process iteratively until one of the conditions (70), (72), (74) is satisfied, at which time the search terminates and the best motion vector is selected (76).

If insufficient computing resources are available, the search may be not fully cover the concentric diamonds. In this case, it is possible that a sub-optimal motion vector may be obtained. In many cases, however, an optimal or satisfactory motion vector may emerge from the anchor point or the first few concentric diamonds. In either case, the concentric diamond approach provides a tradeoff between video quality and consumption of power and computing resources.

Figure 7:
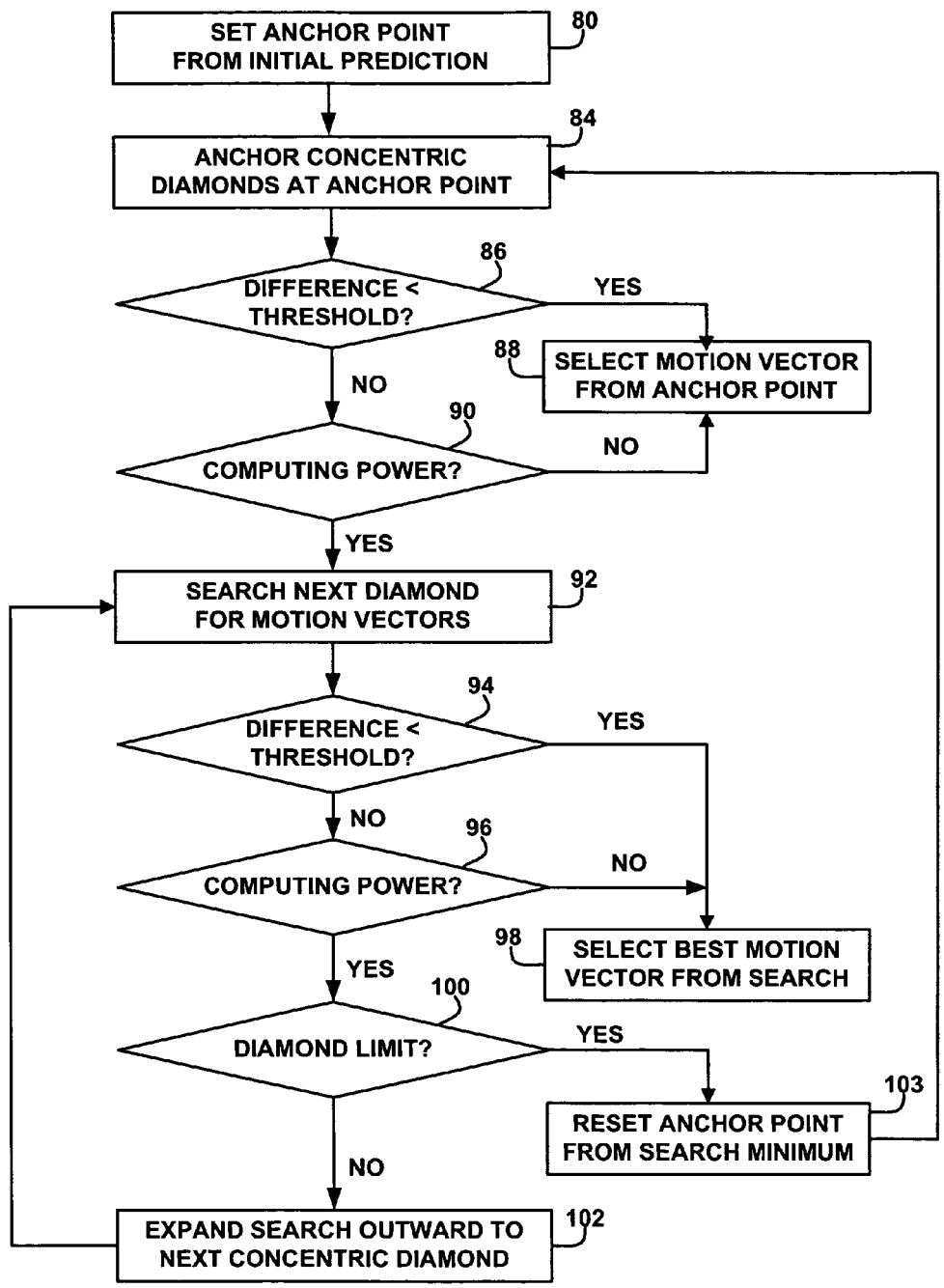
FIG. 7 is a flow diagram illustrating a scalable motion estimation technique using a concentric region search with a movable anchor point.

FIG. 7 is a flow diagram illustrating a scalable motion estimation technique using a concentric region search with a movable anchor point. The technique illustrated in FIG. 7 generally corresponds to the technique illustrated in FIG. 6. However, FIG. 7 further illustrates movement of the anchor point of the concentric diamonds, e.g., as illustrated in the search space diagram of FIG. 5. As shown in FIG. 7, search unit 50 sets the anchor point for the concentric diamonds at a coordinate determined from the initial prediction (80). Search unit 50 then centers the concentric diamonds around the anchor point (84).

Search unit 50 determines the difference value between the video block identified by the anchor point and the video block to be encoded. If the difference value is less than an applicable threshold (86), such as a SAD threshold, the search may be terminated. In this case, the motion vector may be selected from the anchor point (88). If the difference value exceeds the difference threshold (86), however, search controller 48 determines whether there is sufficient computing power (90) to scale the search outward to the first concentric diamond region. If there is not sufficient computing power to support expansion, then the motion vector may be selected from the anchor point (88), i.e., from the initial prediction.

If sufficient computer power is available (90), however, search controller 48 permits search unit 50 to expand the search outward and search the next diamond for motion vectors (92). If search unit 50 finds a video block with a satisfactory difference value (94) within the diamond, the search unit selects the motion vector associated with the pertinent video block as the best motion vector from the search (98). If the difference threshold is not satisfied (94), there is sufficient computing power (96), and the end (i.e., outer limit) of the diamonds has not yet been reached (100), search unit 50 expands the search outward to the next concentric diamond (102). If neither of conditions (94), (96) is satisfied, then search unit 50 selects the best motion vector found in the search up to that point (98).

If conditions (94), (96) are satisfied, but the diamond limit has been reached (100), search unit 50 resets the anchor point from the minimum difference value returned from the search up to that point (103). As described with reference to FIG. 5, the new anchor point may identify the upper left pixel coordinates of the video block that yielded the minimum difference value during the search of the diamonds. The concentric diamonds are then anchored, i.e., recentered, around the reset anchor point (84) for additional searching. In this manner, the search not only extends concentrically outward, but also moves to a new anchor point within the video frame at selected stages of the search. The number of diamonds searched before resetting the anchor point may vary. After resetting, the search continues through the concentric diamonds, starting with the reset anchor point.

When the anchor point is not reset (103), search unit 50 expands the search outward (102), and searches the next diamond (92). The expansion and search process continues iteratively until one of the conditions (94), (96), (100) is satisfied. In some embodiments, an iteration limit also may be applied so that the process terminates even if additional computing power is available. In this manner, search controller 48 avoids excessively long or indefinite searches, and particularly searches that are unlikely to yield better results. In the examples of FIGS. 6 and 7, search controller 48 monitors available computing resources during the course of a search, and directs search unit 50 to terminate the search when computing resources are exhausted. In other embodiments, search controller 48 may specify a predetermined number of searches before the search starts. In this case, when the concentric diamond search has exhausted the predetermined number of searches, the search is terminated. The number of searches may be established for each video block, e.g., macroblock or microblock, to be encoded, or for an entire frame.

Figure 8:
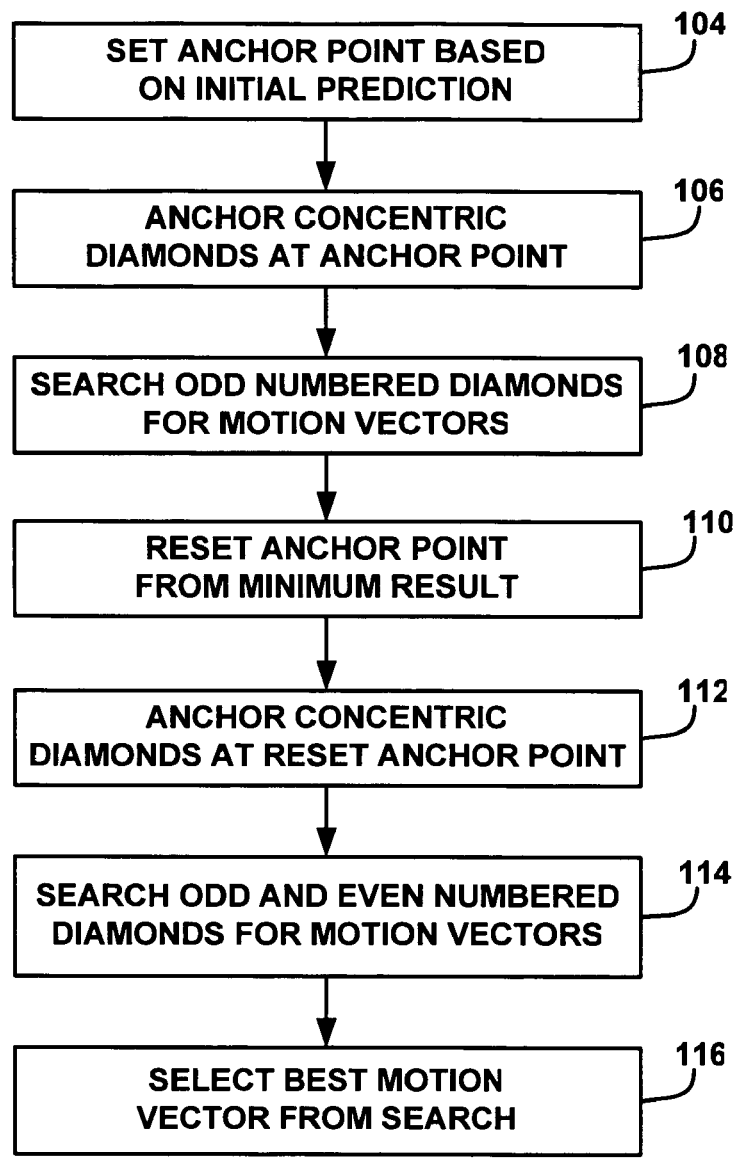
FIG. 8 is a flow diagram illustrating a scalable motion estimation technique using a multi-resolution concentric region search.

FIG. 8 is a flow diagram illustrating a scalable motion estimation technique using a multi-resolution concentric region search. As shown in FIG. 8, search unit 50 sets the anchor point for the concentric region search based on an initial prediction (104) of the video block in the reference frame that will most closely approximate the video block in the current frame to be encoded. Search unit 50 anchors a set of concentric diamonds at the anchor point (106), and then conducts a search of the odd numbered diamonds for motion vectors (108). If the central anchor point is designated D0 and the successive diamond regions are designated D1-Dn, then the odd numbered diamond search would extend to diamonds D1, D3, D5, and so forth.

Upon identifying a minimum difference value among the video blocks considered in the odd numbered diamond search, search unit 50 resets the anchor point according to the minimum result (110), and anchors the concentric diamonds at the reset anchor point (112). Search unit 50 then searches both the odd and even numbered diamonds for motion vectors (114), and selects the best motion vector from the search (116), i.e., the motion vector associated with the video block yielding the lowest difference value versus the video block to be encoded. The multi-resolution concentric diamond search illustrated by FIG. 8 permits a sub-sampled search of the diamond, i.e., by sampling only the odd diamonds first, followed by a full search that is centered about a more fine-tuned anchor point.

Various embodiments have been described. These and other embodiments are within the scope of the following claims.

The invention claimed is:

1. A video encoding method comprising:
   defining a search space comprising at least a portion of an array of video blocks within a video frame previous to a current video frame to be encoded, wherein said video blocks are arranged in an array within the search space;
   defining an anchor point within the array of video blocks, wherein the anchor point is a central point anchored at an initial motion vector prediction;
   defining multiple concentric regions within the search space wherein each video block within the video frame comprises an array of pixels, addressable using coordinates and wherein the perimeter of the multiple concentric regions cross or encompass one or more video blocks, said multiple concentric regions centered at the anchor point wherein defining the concentric regions comprises:
      determining whether computing power available to the video encoding system at the time of the search space is sufficient to extend the search space outward to the next concentric region of the video frame previous to the current video frame; and
      iteratively expanding the search space outward by increasing the number of the concentric regions based on the determination;
   evaluating, using a processor of the video encoding system, video blocks associated with the concentric regions to identify a video block yielding a minimum difference value relative to a current video block to be encoded; and
   encoding the current video block with a motion vector based on the identified video block.

2. The method of claim 1, wherein the concentric regions include a first concentric region nearest the anchor point, and a second concentric region outside the first concentric region.

3. The method of claim 2, wherein evaluating video blocks further comprises first evaluating a video block associated with the anchor point, and then evaluating video blocks associated with the first concentric region if the video block associated with the anchor point does not yield a difference value less than a threshold value.

4. The method of claim 2, wherein evaluating video blocks further comprises first evaluating a video block associated with the anchor point, then evaluating video blocks associated with the first concentric region if the video block associated with the anchor point does not yield a difference value less than a threshold value, and then evaluating video blocks associated with the second concentric region if the video blocks associated with the anchor point and the first concentric region do not yield a difference value less than a threshold value.

5. The method of claim 1, wherein evaluating video blocks further comprises first evaluating video blocks associated with the anchor point, and then evaluating video blocks associated with the concentric regions in order starting with an innermost concentric region and extending outward to video blocks associated with outer concentric regions.

6. The method of claim 1, wherein the anchor point indicates a pixel location of one of the video blocks that corresponds to an initial prediction of the video block yielding a minimum difference value relative to the current video block to be encoded.

7. The method of claim 1, wherein each of the concentric regions defines a perimeter that indicates pixel locations of some of the video blocks associated with the respective concentric regions.

8. The method of claim 1, further comprising:
initially identifying a video block yielding a minimum difference value relative to the current video block to be encoded;
redefining the anchor point to a pixel location that corresponds to the initially identified video block; and
redefining the concentric regions to be centered at the redefined anchor point,
wherein evaluating video blocks further comprises evaluating video blocks associated with the redefined concentric regions to identify a video block yielding a minimum difference value relative to a current video block to be encoded.

9. The method of claim 1, further comprising:
evaluating video blocks associated with a subset of the concentric regions;
initially identifying a video block from the subset of the concentric regions yielding a minimum difference value relative to the current video block to be encoded;
redefining the anchor point to a pixel location that corresponds to the initially identified video block; and
redefining the concentric regions to be centered at the redefined anchor point,
wherein evaluating video blocks further comprises evaluating video blocks associated with the redefined concentric regions to identify a video block yielding a minimum difference value relative to a current video block to be encoded.

10. The method of claim 1, further comprising terminating the evaluation of the video blocks if one of the video blocks yields a difference value that satisfies a threshold value.

11. A video encoder comprising: a memory storing an array of video blocks; and a processor that is configured to:
define a search space comprising at least a portion of the video blocks within a video frame previous to a current video frame to be encoded wherein said video blocks are arranged in an array within the search space;
define an anchor point within the array of video blocks, wherein the anchor point is a central point anchored at an initial motion vector prediction;
define multiple concentric regions within the search space wherein each video block within the video frame comprises an array of pixels, addressable using coordinates and wherein the perimeter of the multiple concentric regions cross or encompass one or more video blocks, said multiple concentric regions centered at the anchor point within the array of video blocks wherein defining the concentric regions comprises determining whether computing power available to the video encoder at the time of the search space is sufficient to extend the search space outward to the next concentric region of the video frame previous to the current video frame and iteratively expanding the search space outward by increasing the number of the concentric regions based on the determination,
evaluate video blocks associated with the concentric regions to identify a video block yielding a minimum difference value relative to a current video block to be encoded, and
encode the current video block with a motion vector based on the identified video block.

12. The video encoder of claim 11, wherein the concentric regions include a first concentric region nearest the anchor point, and a second concentric region outside the first concentric region.

13. Video encoder of claim 12, wherein the processor first evaluates a video block associated with the anchor point, and then evaluates video blocks associated with the first concentric region if the video block associated with the anchor point does not yield a difference value less than a threshold value.

14. The video encoder of claim 12, wherein the processor first evaluates a video block associated with the anchor point, then evaluates video blocks associated with the first concentric region if the video block associated with the anchor point does not yield a difference value less than a threshold value, and then evaluates video blocks associated with the second concentric region if the video blocks associated with the anchor point and the first concentric region do not yield a difference value less than a threshold value.

15. The video encoder of claim 11, wherein the processor first evaluates video blocks associated with the anchor point, and then evaluates video blocks associated with the concentric regions in order starting with an innermost concentric region and extending outward to video blocks associated with outer concentric regions.

16. The video encoder of claim 11, wherein the anchor point indicates a pixel location of one of the video blocks that corresponds to an initial prediction of the video block yielding a minimum difference value relative to the current video block to be encoded.

17. The video encoder of claim 11, wherein each of the concentric regions defines a perimeter that indicates pixel locations of some of the video blocks associated with the respective concentric regions.

18. The video encoder of claim 11, wherein the processor initially identifies a video block yielding a minimum difference value relative to the current video block to be encoded, redefines the anchor point to a pixel location that corresponds to the initially identified video block, and redefines the concentric regions to be centered at the redefined anchor point, and wherein evaluating video blocks further comprises evaluating video blocks associated with the redefined concentric regions to identify a video block yielding a minimum difference value relative to a current video block to be encoded.

19. The video encoder of claim 11, wherein the processor evaluates video blocks associated with a subset of the concentric regions, initially identifies a video block from the subset of the concentric regions yielding a minimum difference value relative to the current video block to be encoded, redefines the anchor point to a pixel location that corresponds to the initially identified video block, and redefines the concentric regions to be centered at the redefined anchor point, wherein evaluation of the video blocks further comprises evaluation of video blocks associated with the redefined concentric regions to identify a video block yielding a minimum difference value relative to a current video block to be encoded.

20. The video encoder of claim 11, wherein the processor terminates the evaluation of the video blocks if one of the video blocks yields a difference value that satisfies a threshold value.

21. A video encoder comprising:
means for storing an array of video blocks; and
means for electronically processing the video blocks comprising:
means for defining a search space comprising at least a portion of the video blocks within a video frame previous to a current video frame to be encoded wherein said video blocks are arranged in an array within the search space;
means for defining an anchor point within the array of video blocks;
means for defining multiple concentric regions within the search space wherein each video block within the video frame comprises an array of pixels, addressable using coordinates and wherein the perimeter of the multiple concentric regions cross or encompass one or more video blocks, said multiple concentric regions centered at the anchor point wherein defining the concentric regions comprises determining whether computing power available to the video encoding system at the time of the search space is sufficient to extend the search space outward to the next concentric region of the video frame previous to the current video frame and iteratively expanding the search space outward by increasing the number of the concentric regions based on the determination;
means for evaluating video blocks associated with the concentric regions to identify a video block yielding a minimum difference value relative to a current video block to be encoded; and
means for encoding the current video block with a motion vector based on the identified video block.

22. The video encoder of claim 21, wherein the concentric regions include a first concentric region nearest the anchor point, and a second concentric region outside the first concentric region, and wherein the evaluating means first evaluates a video block associated with the anchor point, then evaluates video blocks associated with the first concentric region if the video block associated with the anchor point does not yield a difference value less than a threshold value, and then evaluates video blocks associated with the second concentric region if the video blocks associated with the anchor point and the first concentric region do not yield a difference value less than a threshold value.

23. The video encoder of claim 21, wherein the processing means further comprises:
means for initially identifying a video block yielding a minimum difference value relative to the current video block to be encoded;
means for redefining the anchor point to a pixel location that corresponds to the initially identified video block; and
means for redefining the concentric regions to be centered at the redefined anchor point,
wherein the evaluating means evaluates video blocks associated with the redefined concentric regions to identify a video block yielding a minimum difference value relative to a current video block to be encoded.

24. A non-transitory computer-readable medium having stored thereon instructions that when executed cause a processor to:
define a search space comprising at least a portion of an array of video blocks within a video frame previous to a current video frame to be encoded wherein said video blocks are arranged in an array within the search space;
define an anchor point within the array of video blocks;
define multiple concentric regions within the search space wherein each video block within the video frame comprises an array of pixels, addressable using coordinates and wherein the perimeter of the multiple concentric regions cross or encompass one or more video blocks, said multiple concentric regions centered at the anchor point wherein defining the concentric regions comprises determining whether the computing power available to the video encoding system at the time of the search space is sufficient to extend the search space outward to the next concentric region of the video frame previous to the current video frame and iteratively expanding the search space outward by increasing the number of the concentric regions based on the determination;
evaluate video blocks associated with the concentric regions to identify a video block yielding a minimum difference value relative to a current video block to be encoded; and
encode the current video block with a motion vector based on the identified video block.

25. The computer-readable medium of claim 24, wherein the concentric regions include a first concentric region nearest the anchor point, and a second concentric region outside the first concentric region, and wherein evaluation of the video blocks further comprises first evaluating a video block associated with the anchor point, then evaluating video blocks associated with the first concentric region if the video block associated with the anchor point does not yield a difference value less than a threshold value, and then evaluating video blocks associated with the second concentric region if the video blocks associated with the anchor point and the first concentric region do not yield a difference value less than a threshold value.

26. The computer-readable medium of claim 24, further comprising instructions to cause a processor to:
initially identify a video block yielding a minimum difference value relative to the current video block to be encoded;
redefine the anchor point to a pixel location that corresponds to the initially identified video block; and
redefine the concentric regions to be centered at the redefined anchor point,
wherein evaluation of video blocks further comprises evaluation of video blocks associated with the redefined concentric regions to identify a video block yielding a minimum difference value relative to a current video block to be encoded.

27. A video encoding method comprising:
defining a search space comprising at least a portion of an arrow of video blocks within a video frame previous to a current video frame to be encoded wherein said video blocks are arranged in an array within the search space;
defining an anchor point within the array of video blocks, wherein the anchor point is a central point anchored at an initial motion vector prediction;

defining multiple concentric regions within the search space wherein each video block within the video frame comprises an array of pixels, addressable using coordinates and wherein the perimeter of the multiple concentric regions cross or encompass one or more video blocks, said multiple concentric regions centered at the anchor point wherein defining the concentric regions comprises:

determining, on a processor of a video encoding system, whether computing power available to the video encoding system at the time of the search space is sufficient to extend the search space outward to the next concentric region of the video frame previous to the current video frame;

iteratively expanding the number of concentric regions within the video block search space based on the determination and evaluating, using the processor of the video encoding system, video blocks associated with the selected number of concentric regions within a video block search space to identify a video block yielding a minimum difference value relative to a current video block to be encoded; and encoding the current video block with a motion vector based on the identified video block.

28. The method of claim 27, wherein evaluating video blocks comprises evaluating video blocks starting with an innermost concentric region and extending the evaluation outward to other concentric regions.

29. The method of claim 27, further comprising terminating the evaluation of the video blocks if one of the video blocks yields a difference value that satisfies a threshold value.

* * * * *